US005467274A

United States Patent [19]
Vax

[11] Patent Number: 5,467,274
[45] Date of Patent: Nov. 14, 1995

[54] METHOD OF DEBRIEFING MULTI AIRCRAFT OPERATIONS

[75] Inventor: Hanan Vax, Yavne, Israel

[73] Assignee: Rada Electronic Industries, Ltd., Herzlia, Israel

[21] Appl. No.: 851,630

[22] Filed: Mar. 16, 1992

[30] Foreign Application Priority Data

Mar. 25, 1991 [IL] Israel .......................................... 97663

[51] Int. Cl.$^6$ ................................................. G06F 17/40
[52] U.S. Cl. .............................. 364/424.06; 364/424.04; 360/5
[58] Field of Search .................... 364/424.03, 424.04, 364/443, 424.06, 449; 360/5, 8, 31; 73/489; 369/21

[56] References Cited

U.S. PATENT DOCUMENTS

| | | | |
|---|---|---|---|
| 3,900,887 | 8/1975 | Soga et al. | 360/18 |
| 4,258,421 | 3/1981 | Juhasz et al. | 364/424.04 |
| 4,409,670 | 10/1983 | Herndon et al. | 364/424.06 |
| 4,470,116 | 9/1984 | Ratchford | 364/424 |
| 4,604,711 | 8/1986 | Benn et al. | 364/424.06 |
| 4,656,585 | 4/1987 | Stephenson | 364/424.06 |
| 4,660,145 | 4/1987 | Hansen | 364/424.06 |
| 4,694,119 | 9/1987 | Groenewegen | 174/52 |
| 4,729,102 | 3/1988 | Miller, Jr. et al. | 364/424.06 |
| 4,814,896 | 3/1989 | Heitzman et al. | 358/335 |
| 4,853,859 | 8/1989 | Morita et al. | 364/424.03 |
| 4,868,686 | 9/1989 | Guisinger et al. | 360/8 |
| 5,014,206 | 5/1991 | Scribner et al. | 364/443 |
| 5,289,377 | 2/1994 | Yokote et al. | 364/424.04 |

FOREIGN PATENT DOCUMENTS

| | | |
|---|---|---|
| 74058 | 1/1959 | Israel. |
| 66730 | 9/1981 | Israel. |
| 74056 | 9/1988 | Israel. |
| 74057 | 12/1988 | Israel. |
| 76527 | 1/1989 | Israel. |

OTHER PUBLICATIONS

AD–A165 834 Video Standards and Formats, Feb. 1986, Document 452–86, Range Commanders Council White Sands Missile Range, New Mexico 88002.

Brochure: Precision Echo, Inc. AN/AQH–9 Mission Recorder System.

"Differential Operation of NAVSTAR GPS" by Rudolph M. Kalafus et al, pp. 197–214.

"The Application of NAVSTAR Differnetial GPS in the Civilian Community" by Jacques Beser et al, pp. 167–196.

Primary Examiner—Gary Chin
Attorney, Agent, or Firm—Irvin A. Lavine; Nath & Associates

[57] ABSTRACT

The present invention relates to a method for debriefing aircraft A/C operations. The method comprises forwarding selected flight data obtained, e.g. from a suitable GPS receiver, collected on the aircraft computer to a monitoring device, encoding from said monitoring device the digital data by an Asynchronous protocol, e.g. RS-232 protocol, onto the cassette of the AVTR and thereafter subjecting the cassette on the ground to a data reduction process, thus obtaining a display file. The GPS receiver is, for example, a commercial code receiver which may be connected to one antenna only. The data received from the GPS receiver are being forwarded to the monitoring device, encoded simultaneously with the other flight data and, by the same method, correcting on the ground in the course of the reduction process the Inertial Navigation System (INS) position drifts. Differential GPS technique may be used on the ground. Several individual display files may be syunchronized into a single display file.

8 Claims, 11 Drawing Sheets

METHOD OF DEBRIEFING MULTI AIRCRAFT OPERATIONS

BACKGROUND OF THE INVENTION

1. Field of the Invention

The present invention relates to a method for debriefing multi aircraft (A/C) operations.

2. Related Art

It is very important to be able to analyse the performance of pilot(s) after a flight. The post flight analysis occurs in a meeting referred to as a "debrief". A debrief meeting usually includes the pilots, crew members and other involved persons who discuss the group and individual performances during the flight, critiquing problems and proposing solutions or procedures to improve performance in the future. This procedure maximizes the training value of the flight. The value of the debrief is increased if it is held as soon after the flight as possible, while recollections and impressions are still fresh. A debriefing system should have the ability to display to the pilots information about the performance parameters of their aircraft, information about their aircraft in relation to geographic location and other aircraft, and audio/video record of the flight. A known tool for this purpose is Air Combat Maneuvering Instrumentation (or Range) (ACMI/ACMR).

The most well known ACMI consists of a ground Range that tracks the A/C training above it. The A/C carries a special pod which enables ground tracking and data transmission from the A/C to the ground.

The data of the ground range and the A/C is gathered (in real-time in the ground station. Three-dimensional flight tracks are reconstructed on display devices which enable a visual and quantitative debriefing of the flight.

However, this known ACMI has serious disadvantages, namely it is limited to a special ground range and can thus be utilised only for a very restricted number of training flights, i.e. those being performed over said ground range. Moreover, it is very expensive.

It has therefore been desirable to find a method which would enable the debriefing of multi A/C training operations which could overcome the above drawbacks.

Said method should enable storage of the various data of the flight parameters required for the debriefing on board of the A/C, in the course of the training operation and not require data transmission from the aircraft to the ground range in the course of the flight.

Moreover, said method should be compatible with the Global Positioning System (GPS).

The GPS system achieves an accurate fixation of the position of the aircraft in a given moment without the need of ground tracking and synchronization with the aircraft.

Many military aircraft are provided with integral video tape recorders (AVTR); on the recording tape thereof are recorded both the audio output and the video output. However, the AVTR is at the present time not fully utilised.

It was therefore advantageous to find a method in which the AVTR can be utilised as in digital data storage for the flight parameters which are collected from the aircraft systems for storage and future retrieval in a digital form.

The use of the AVTR in connection with the present invention has, inter alia, the following advantages:

a) It saves the need for planting an additional recording device in the aircraft, which is usually constrained by weight and size limitations.

b) The video cassette gives very large storage capacity which is a major problem for digital storage methods and especially when audio information is required to be stored as well.

c) The ability to store 1–3 hours of flight time history enables the use of the system not only for Air Combat Maneuvering but also for Air-to-Ground missions or other extended exercises without bothering the pilot with storage volume management during the mission. Moreover, it enables the storage of maintenance information (engine parameters, etc.) that will be used for the post flight maintenance use.

There is known a device being used for test flights in which the flight data are collected by suitable means and encoded into VTR. However, in this device the encoding is performed by Pulse-Code-Modulation (PCM) method which is a very precisely synchronized format that requires, for this kind of implementation (i.e. video insertion), signal compression and stability in order to adapt it to video protocol timing. A disadvantage of devices requiring synchronous protocols is that once a message is begun if must be received immediately or the data will be lost because internal buffering is minimal.

The PCM airborne encoder and the ground demodulator are therefore very complicated and expensive and are not suitable for the present purpose.

SUMMARY OF THE INVENTION

The present invention provides a method of recording flight data on an existing video tape recorder in the aircraft. The data is encoded, along with audio and video data on the video tape. A Global Positioning System can be used to provide accurate time and location information for the events recorded on the video tape. The video tape of each aircraft is removed after landing of the aircraft, and is taken to a processing station where the video/audio data is separated from the digital flight data. The digital data is processed to create a display file whereby the aircraft data can be displayed in the debriefing process in a tabular or graphical mode in conjunction with the video and audio data. The display files of more than one aircraft can be combined to create a display file which is able to show multiple aircraft operations. Thus a thorough debrief incorporating the essential characteristics of the instrumented ranges can be economically performed without using an instrument range.

It has now surprisingly been found that for the purpose of the present invention the PCM means may be substituted by an Asynchronous protocol in which synchronization is achieved in the data word level by redundant synchronizing bits (e.g. RS-232). An asychronous protocol is used to negate the need for prearranged timing agreements to accomplish data transfer between the input/output devices and the Central Processing Unit (CPU). Control signals between the devices, known in the art as "handshake signals", govern the flow of data between input devices and the CPU. Such a system is far more robust when encountering timing gaps and data is less likely to be lost. This format was found to be much more adaptable to video protocol timing being insensitive to inter-word timing gap. Moreover, it is much cheaper and it simplifies the decoding on the ground and the interface with the computer.

The present invention thus consists in a method for debriefing A/C operations which comprise forwarding selected flight data collected on the aircraft computer to a monitoring device, encoding from said monitoring device the digital data by an Asynchronous protocol onto the cassette of the AVTR and thereafter subjecting the cassette on the ground to a data reduction process, thus obtaining a display file.

A preferred asynchronous protocol is the RS-232 protocol.

As indicated above, one should be able to utilise the GPS system. Navigational accuracy is essential to effective aircraft operations debriefing. It is important that the geographical location of the events recorded in the flight be ascertained with as much accuracy as possible. Said system makes the required correction of the Inertial Navigation System (INS) position data to the desired accuracies.

The Global Positioning System (GPS) is a satellite based navigation system that will provide the user with position and precise time information anywhere in the world. There are multiple satellites in Earth orbit broadcasting signals which a properly tuned receiver can receive. A distance can be determined by determining the transmission time necessary for a signal to reach a user from the satellite. Determining distance from the user of four or more satellites at the same time will fix the user's position with a high degree of accuracy, and certainly a greater accuracy than most aircraft inertial navigation systems can provide. The inertial navigation system used in most high performance aircraft relies on heading, speed, rate of turn, and in some cases doppler navigation input signals. Each input into the total system has its own margin of error and the system error, unless corrected to a known location, increases with the length of time that the aircraft is airborne.

It would be preferable to have continuous GPS location data, but for aircraft that do not have an integrated GPS system this method enables the updating of location information and provides correction factors so that acceptable levels of navigation accuracy can be achieved without continuous GPS inputs.

Installing a GPS receiver on highly maneuverable A/C is not a trivial task because of two reasons,:

a) GPS receivers require continuous eye to eye contact between its antenna and the satellites—which is an almost impossible requirement for ACM tasks.

b) GPS receivers are very sensitive to accelerations so ACM is a "hostile atmosphere" for it in this sense also.

In order to overcome these obstacles, the common technological solution is to integrate the GPS with the INS system and thus reduce its sensitivity to dynamic environment and receiving distortions.

Being a real-time process makes this solution complicated and expensive and it is unlikely that it will be implemented just for debriefing systems—it practically excludes most of A/C fleet from getting GPS supported ACMI.

The invention presents a low cost solution that gives adequate answers for any aircraft including the presently unequipped ones (GPS).

Said continuous GPS fixation recording is not required for the method according to the present invention. Thus it is sufficient that it is recorded at various stages, e.g. during the set-up and interception stage and at the end of the flight.

Moreover, the method according to the present invention does not require GPS integration into the aircraft avionics.

In view of the fact that no continuous recording and no GPS aircraft integration are required, the GPS receiver to be installed may be a relatively simple and low-cost one, i.e. commercial C/A code receiver requiring only a single antenna.

There is an improved embodiment of the method according to the present invention in that the data obtained from a suitable GPS receiver being present in the aircraft, will be forwarded to said monitoring device, encoded simultaneously with the other flight data and, by the same method, correcting on the ground in the course of the data reduction process the Inertial Navigation System (INS) position drifts.

The GPS receiver is not, as indicated above, integrated in aircraft avionics but stands alone, receives position fixes and GPS time (UTC) whenever available and records it in the data block (beside the INS position parameters).

The integration of the GPS information with the INS parameters is one after landing in the ground system during data reduction and processing.

After landing, when data is unloaded from the tape of each aircraft, GPS data and INS data are compared, position error vectors are constructed and stored for each A/C, (This process is done only when GPS fix is available!). The position error vectors and their GPS time parameters construct a correction table of the whole flight for each aircraft. This table may also be corrected using differential GPS technique.

The accuracy of the plotted GPS location can be increased by mathematically accounting for inherent inaccuracies in a GPS determined location. Among the inaccuracies are: the GPS signal can be distorted, either deliberately or inadvertently; the user clock is less accurate than that of the GPS satellite signal, which injects an unknown error; and having less than four satellites in view will provide a less accurate fix. A differential GPS technique consists of having a GPS system at a known location, comparing the GPS derived position solution to the known location and computing correction terms to allow the derived location to be corrected to the actual known location. Corrections for errors introduced by ionospheric interference can also be introduced if desired.

Further, during the next stage of the data reduction, when the individual aircraft files are merged into a single display file and synchronized, each INS data frame is corrected using its previously constructed error correction table.

It is assumed that for ACM type of training GPS fixes will not be available for most of the time. In this case the correction will be based mainly on GPS fixes received during the set-up and interception stage and the end of the flight in both stages the aircraft are mainly in straight and level flight.

For data frames where GPS fixes are unavailable the correction will be done by interpolation within the table.

Aircraft computer time will be corrected by GPS time (UTC), thus forming a time base for the synchronization of all the aircraft data files into a single display file that will be stored in the ground computer memory ready for display.

BRIEF DESCRIPTION OF THE DRAWINGS

The present invention will now be illustrated with reference to the accompanying drawings, without being limited by same. In said drawings.

DETAILED DESCRIPTION OF THE PREFERRED EMBODIMENTS

Figure 1:
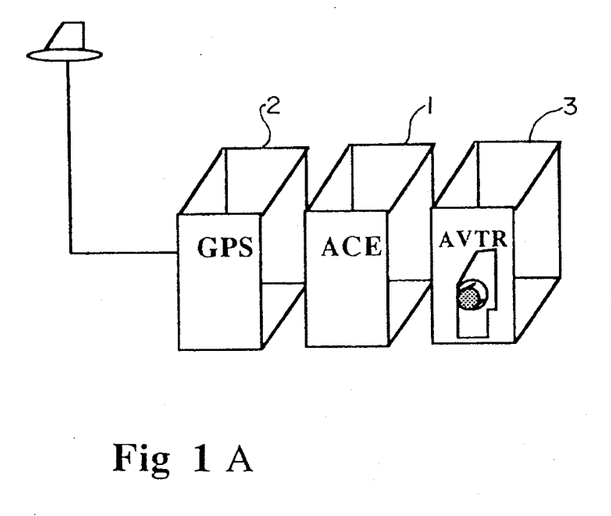
FIG. 1 shows schematical arrangement of the system constructed in accordance with the present invention.

The system shown schematically in FIG. 1 consists essentially of two sub-systems, namely:

1. Airborne Sub-system A, comprising:

a) Flight Monitor (FM) 1, which is the core of the airborne system. It is connected to the aircraft MUX BUS 11 (shown in FIG. 4) through which it gets a continuous selected parameters and to GPS receiver 2, from which it gets position fixes and absolute time clock (UTC). Flight Monitor (FM) 1 constructs an output data file and encodes it into the aircraft video output.

b) GPS 2 receiver which is a low-cost mini-receiver usually used in RPVS. Receiver 2 is present only when the aircraft is not equipped with a GPS system.

c) AVTR (airborne video tape recorder) 3 that is the data storage device of the system (besides its usual video storage tasks).

The airborne system will be installed internally—a single low profile GPS antenna will be installed on the A/C back skin.

Figure 4:
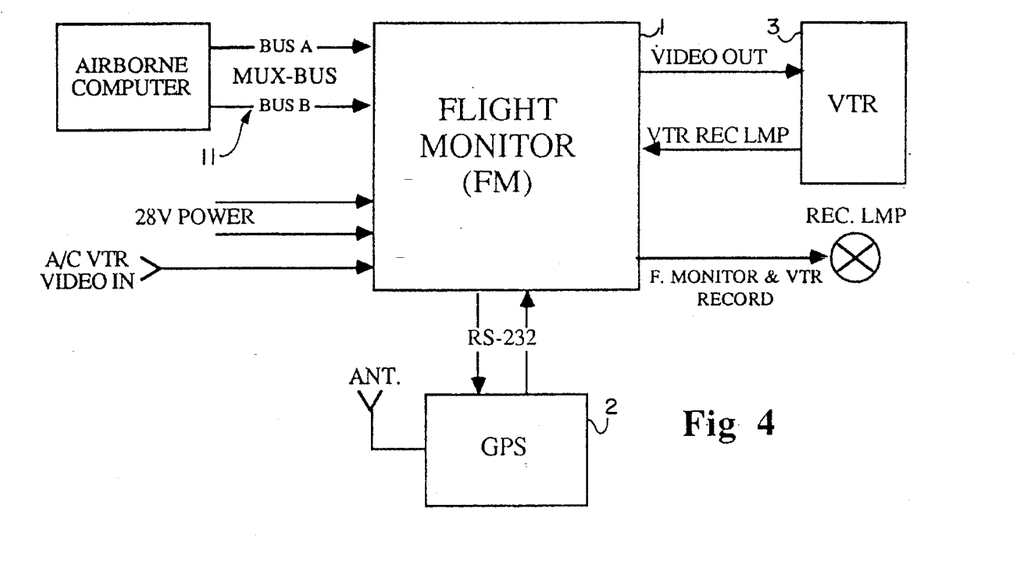
FIG. 4 shows a block diagram illustrating the airborne system, schematically shown in FIG. 1.

This system is shown in detail in FIG. 4; and

2. Ground Station B which consists of:

a standard video player 7 and commercial personal computer 68 in which video decoder 5 will be installed on one of its free PCB slots.

Any of the existing displays and debrief facilities may be used for display by adopting the display output protocol to it.

The system works schematically as follows:

During the flight exercise each of the aircraft will collect and record on-board selected parameters from the aircraft computer or MUX-BUS. 11.

GPS position fixes will be recorded parallelly from GPS receiver 2; the aircraft is unequipped with an integrated GPS system.

All the data collected will be encoded into the aircraft video output and be recorded together with the audio output on the AVTR 3 (with a negligible distortion of the video picture).

Figure 2:
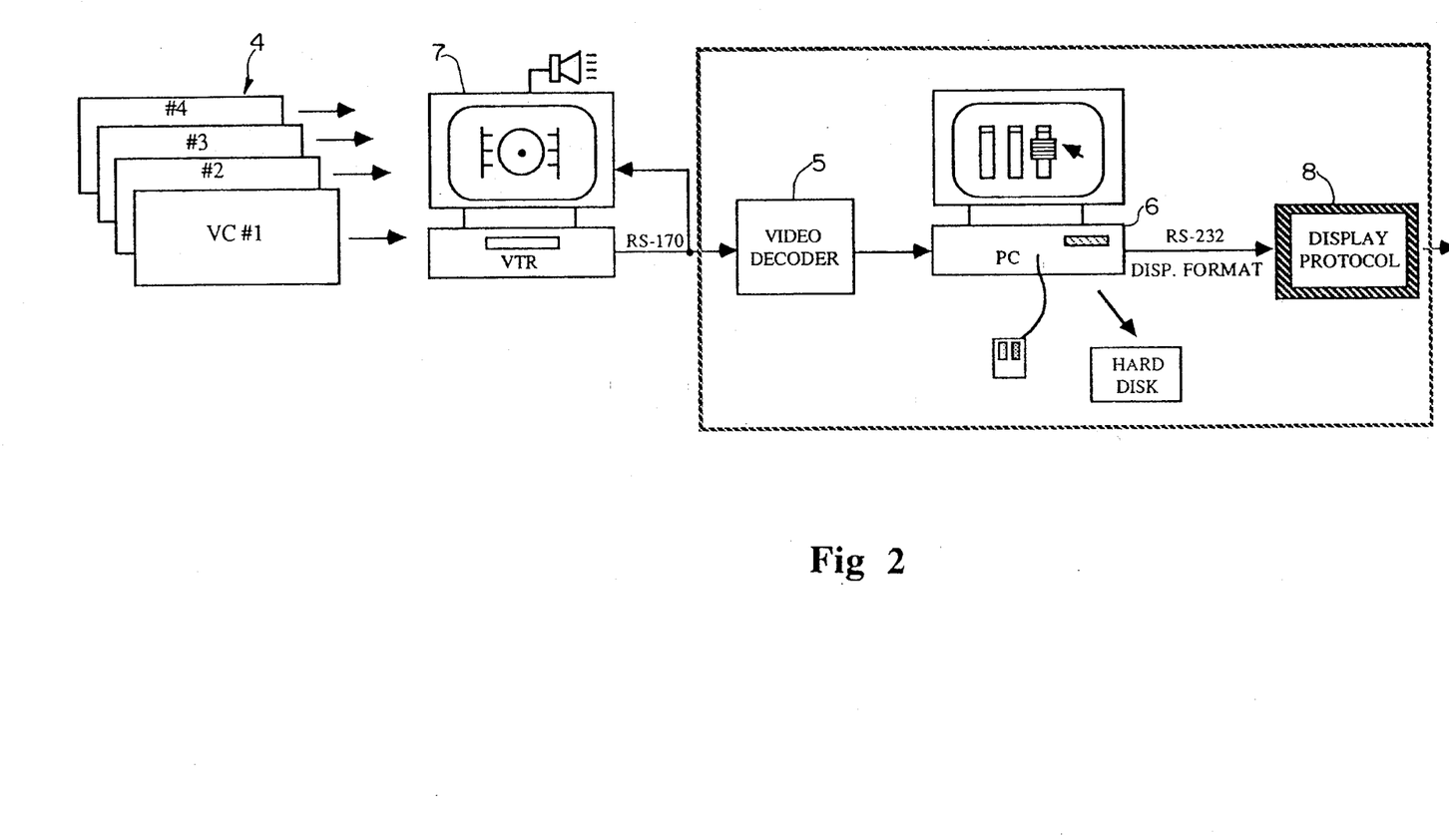
FIG. 2 shows a block diagram describing the data reduction process of the ground system in the ground station, schematically shown in FIG. 1.

After landing each of aircraft video cassettes 4 will go through a data reduction process described in FIG. 2, in which the digital data will be decoded out of each video cassette by decoder 5.

INS position drifts will be corrected by the GPS fixes (both recorded on the tapes).

Figure 3:
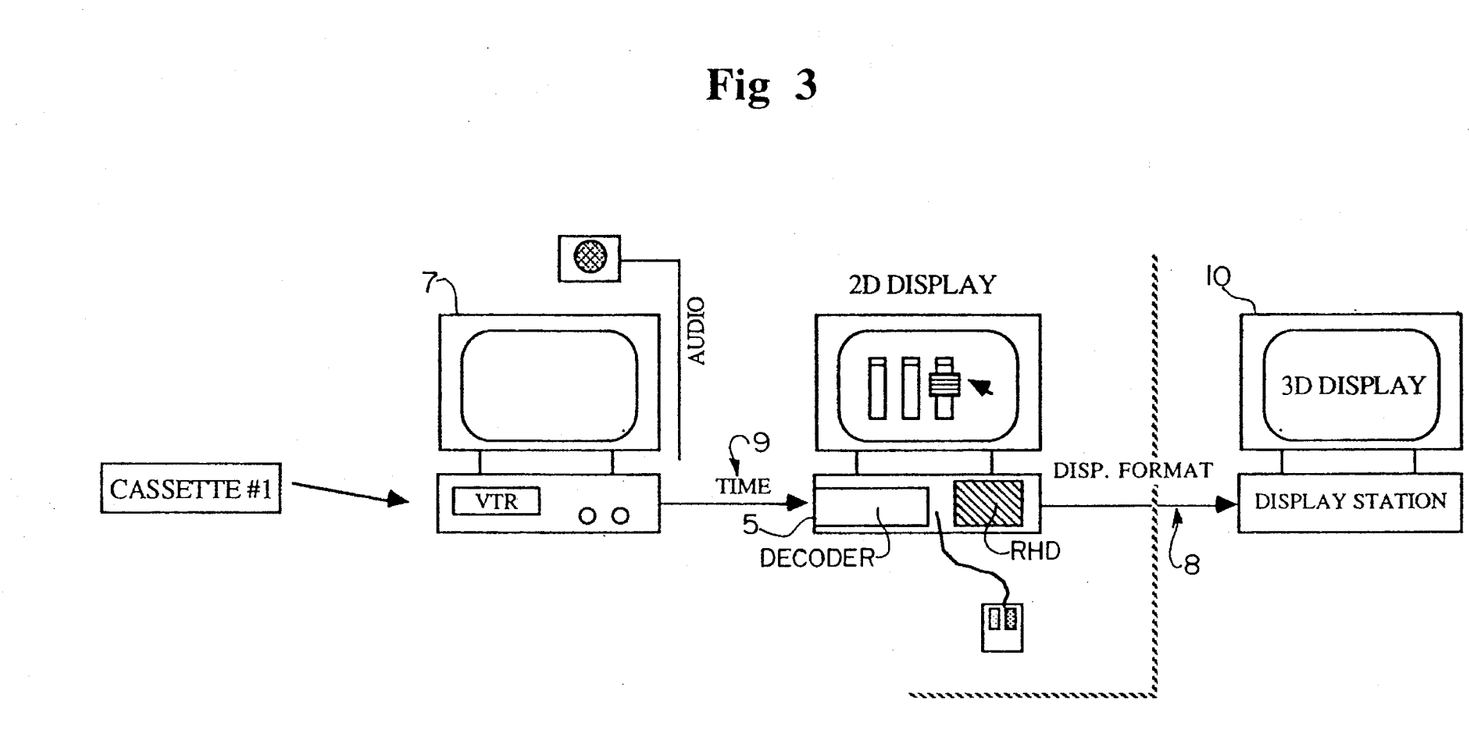
FIG. 3 shows a block diagram describing the debriefing and display mode of the system in the ground station, schematically shown in FIG. 1.

The display and debriefing process is illustrated in FIG. 3.

Video player 7 will be used for audio and video display, the time parameter 9, already planted in each cassette 4 during flight, will be identified by decoder 5 and activate data transmission of display file 8. The transmitted data will be processed into 3-D presentation on graphical station 10 or any existing display facility, thus providing a full synchronization between the 3D display, the video and the audio.

Figure 5:
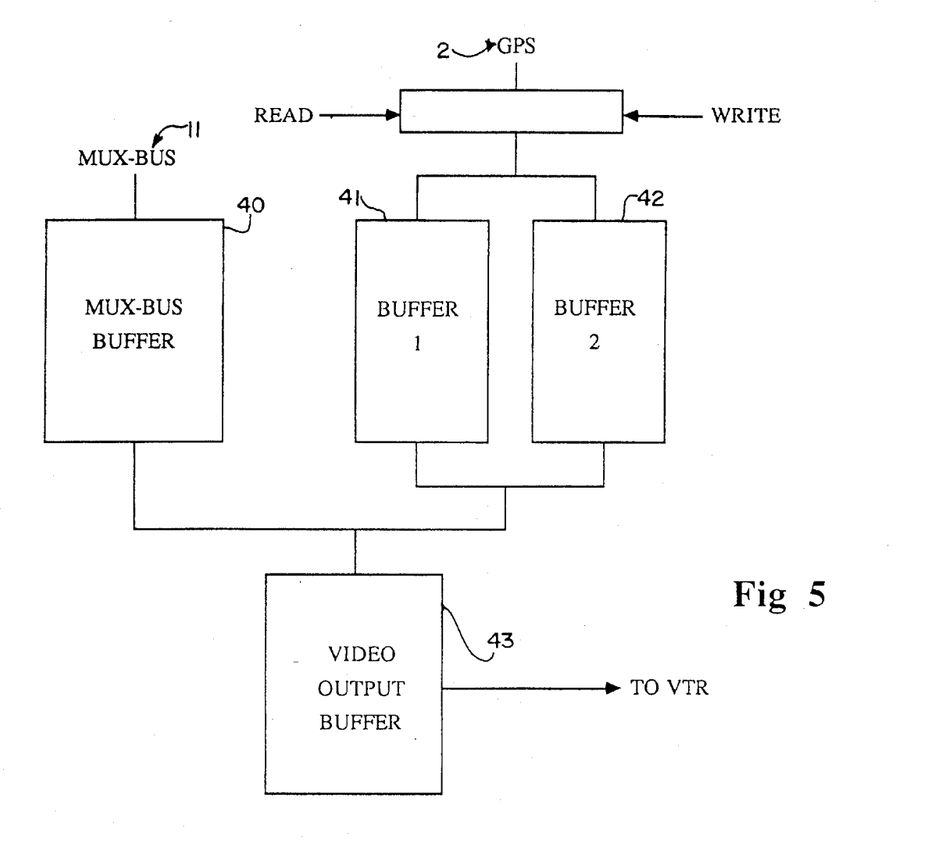
FIG. 5 shows a general block diagram illustrating the data flow in the airborne system, shown in FIG. 4.

The data flow of the Airborne system A is shown in FIG. 5. In this embodiment there are two main data sources MUX BUS 1553 continuous data 11 and RS-232-GPS messages, The MUX BUS selected data words will be store in MUX Buffer 40 in exact predetermined order.

GPS messages will be collected in two buffers 41 and 42; one of the buffers will be used for writing while the other will be used for reading, The buffers will change roles synchronously with the appearance of a new message, One VIDEO OUTPUT BUFFER 43 an output message will be constructed merging GPS and MUX BUS BUFFERS.

The message in video buffer 43 will be transmitted in RS-232 Format into the encoder whenever requested.

Each of the data sources has its own rate of updating. BUS buffer 40 is updated in 50–25 Hz rate, GPS buffers 41 and 42 are updated at 1 per second or less. Video output buffer 43 is updated and transmitted every 100 ms.

Figure 7:
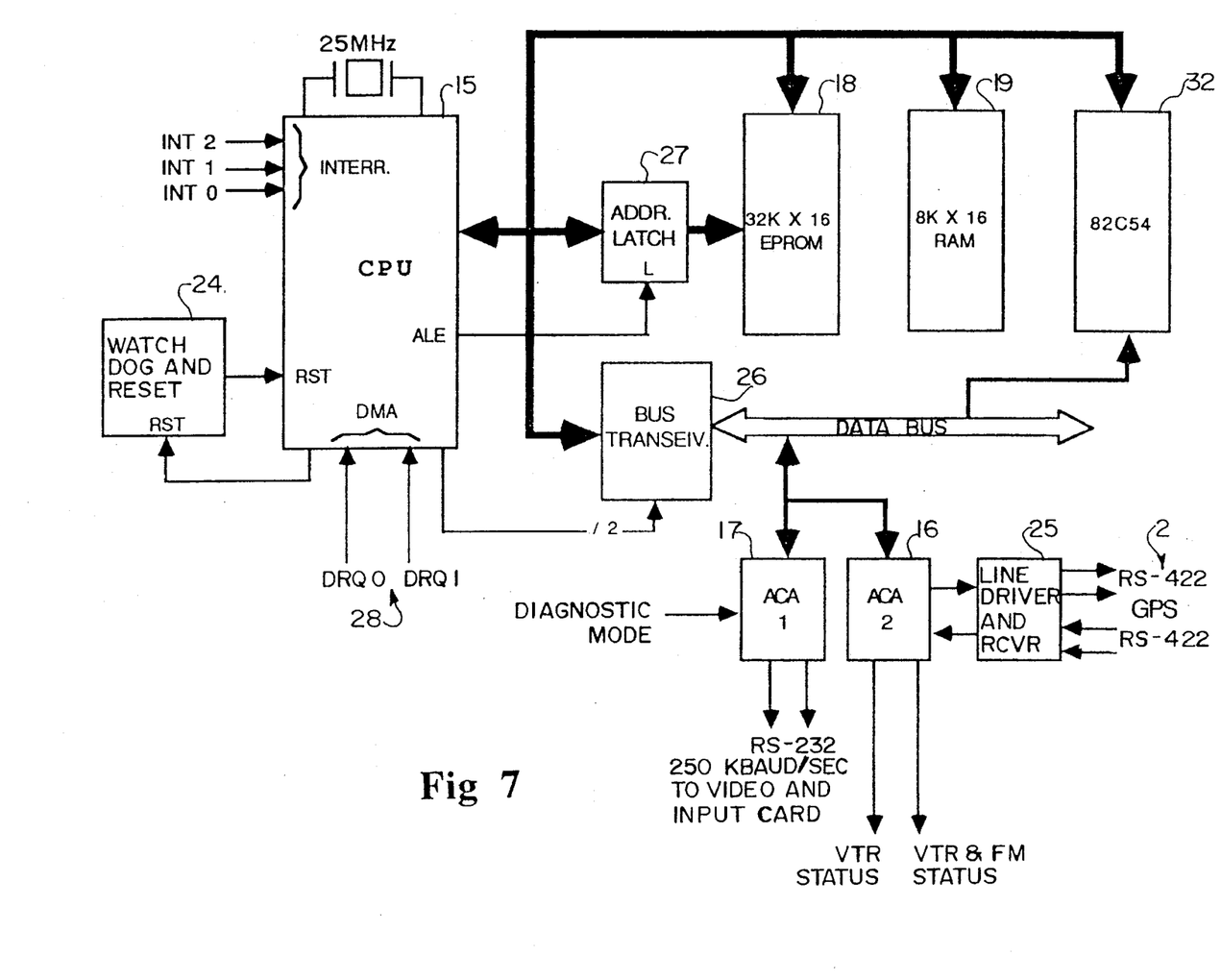
FIG. 7 shows a block diagram of the CPU card of the flight monitor shown in FIG. 6.

The CPU 15 shown in FIG. 7 will handle this process using interrupt logic that takes into account the priorities and data availability.

Figure 6:
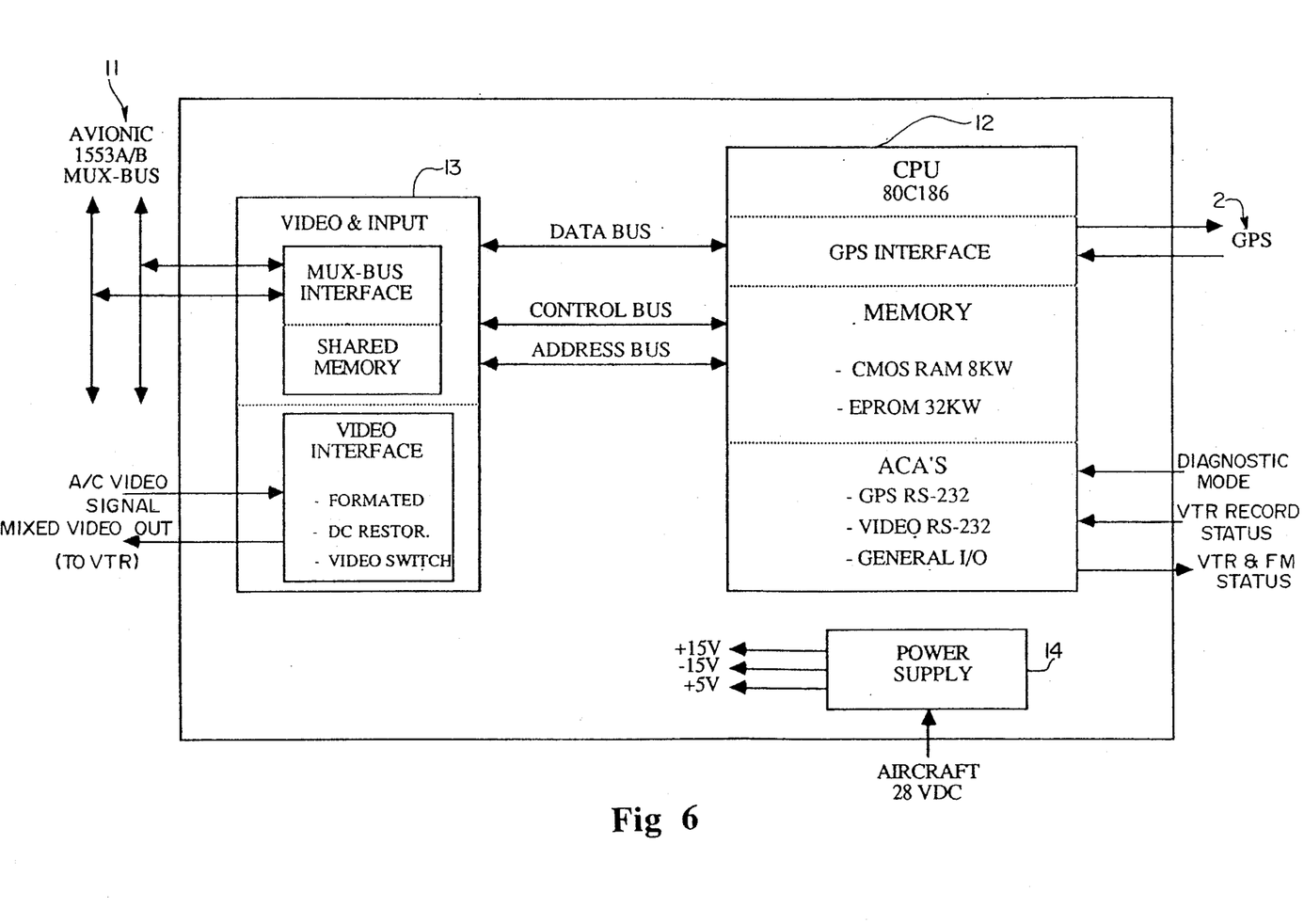
FIG. 6 shows a general block diagram illustrating the Flight Monitor (FM)
Figure 6A:
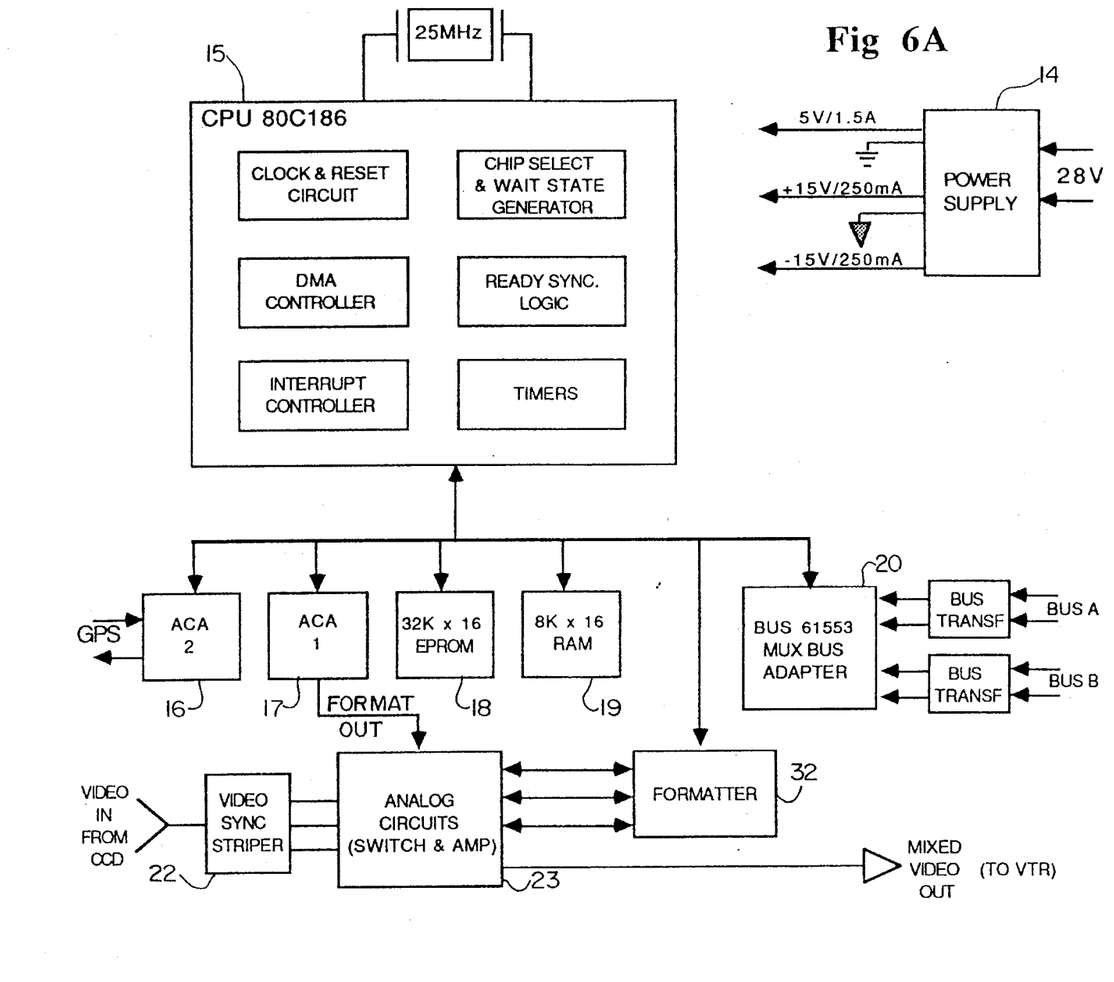
FIG. 6A shows the block diagram illustrated in FIG. 6 in detail.

The general construction of the flight monitor 1 is shown in FIG. 6. The main functions of flight monitor 1 are:

a. Monitor A/C standard 1553 MUX-BUS traffic b. Collect pre-selected data words from the MUX BUS 11 c. Receive preselected GPS 2 messages in RS-232 protocol d. Construct output data file in RS-232 protocol e. Encode output digital data file into A/C video signals In the present embodiment these functions are implemented on three printed circuit boards as illustrated schematically in FIG. 6 and 6A, namely:

a. CPU board, 12, shown in detail in FIG. 7 b. Video and Input board 13, shown in detail in FIG. 8 c. Power Supply board 14

CPU board shown in FIG. 2 contains CPU 15, memory peripherals 18 and 19 and the RS-232 communication circuits 16,17 between the CPU, the GPS receiver and video encoder.

The CPU is based on Intel's 80C186 microcontroller that is a very sophisticated device which includes:

a. Clock and reset circuit b. Chips Select and Wait State Generator c. Ready Synchronization Logic d. Timers and Interrupt Controller e. Direct Memory Access (DMA) controller The CPU is connected via sixteen bit DATA BUS 20 and ADDRESS. LATCH 27 to the following peripherals:

RAM 19 program EPROM 18 (system program and tables) and two Asynchronous Communication Adapters (ACA) 16 and 17.

ACA 17 is used to provide a very high baud rate transmission of RS-232 formatted digital data on which Video Output Buffer 43 will be transmitted to the video encoder.

ACA 16 is used to provide communication with GPS receiver 2 via RS-232 port (differential inputs/outputs according to RS-422 STD).

The CPU uses watch dog circuits 24 to recover from unexpected problems. The circuit provides reset pulse to the CPU when it does not run an expected EPROM program code.

The GPS communication is via RS-422 drivers/receivers 25 based on standard circuits. This type of line drivers permits a very high noise immunity and enables long cables between GPS receiver 2 and the CPU.

The video ACA is connected to the CPU through DMA channel #1. The DMA channel is destination synchronized, that is, Universal Asynchronous Receiver Transmitter (UART) provides CPU with DMA requests 28 when it needs additional data from video buffer 43.

Figure 8:
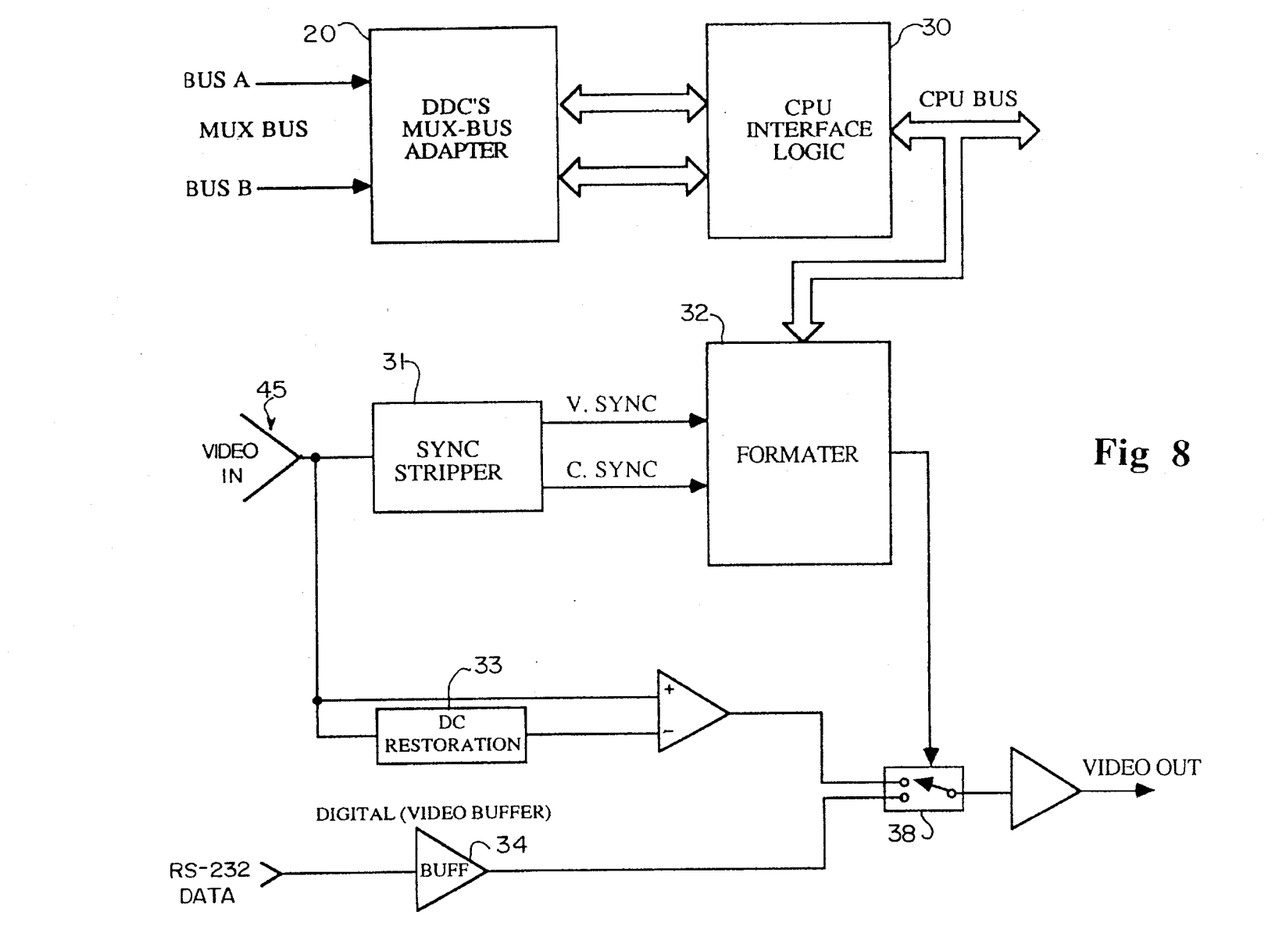
FIG. 8 is the Video and Input Card block diagram which is part of the flight monitor, shown in FIG. 6.

The Video and Input Card is shown in FIG. 8. It has two independent functions, namely:

a. MUX-BUS interface b. Video Encoder

MUX BUS Interface is based in this embodiment on a DDC's Bus ADAPTER 61553.

The ADAPTER 20 functions as BUS MONITOR. This method enables interface with two buses (A and B) without any software changes from the aircraft side which is an important advantage in cases where BUSES are highly loaded, which is the case in most of the operational aircraft.

ADAPTER 20 monitors the BUS traffic for preselected data words and collects them in a MUX BUS Data Buffer 40. BUS ADAPTER 20 is connected to the CPU bus by 16 bits bidirectional data bus driver and 16 bit TRI STATE ADDRESS buffer 30.

BUS-61553 provides all needed handshake control lines including ready line to insert wait states to CPU memory I/O cycle and interrupt line to inform CPU, shown in FIG. 7, about newly received MUX-BUS words.

Figure 9:
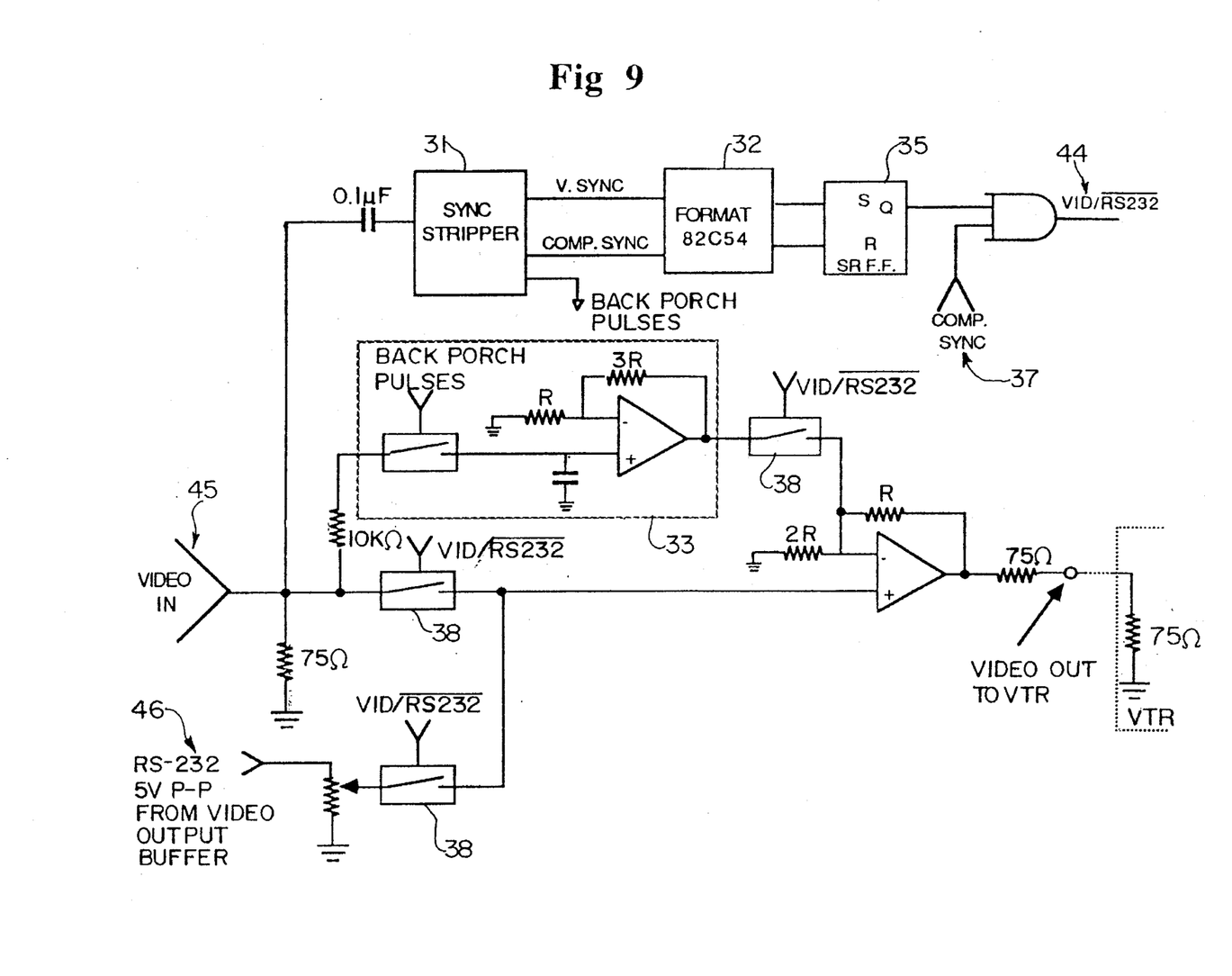
FIG. 9 shows a diagram illustrating the video encoding circuit of the video and input card, shown in FIG. 8.

The video encoder function is illustrated in FIGS. 8 and 9 It contains three main subfunctions, namely:

a. Sync stripper 31 b. DC restoration circuit 33 c. Video Formatter Counter 32

Sync Stripper 31 detects vertical and composite syncs in the RS-170 video A/C output.

These two pulses drive format programmable counter 32, the programmable counter uses two internal counters that are gated by vertical sync:

The first counter counts horizontal sync pulses until it reaches the first horizontal line of the "data window" and the second counts horizontal sync pulses until it reaches the last horizontal line of the window.

In this example the window width is 30 horizontal video lines per video field. In each line one Byte is inserted thus enabling a data insertion rate of 1800 bytes per second.

These two inputs drive S.R.F.F. 35 which controls the data insert mechanism. Data insert window is gated by composite sync.$^{37}$.

The gated output VID/RS-232 44 is used to switch 38 between video signal (video in) 45 and the RS-232 digital data 46 signal coming from the ACA #1 as complying with the two equations:

$$\text{Vout: VID/RS232="1"}=-\text{Vporch+video-in}$$

$$\text{Vout: VID/RS232="0"}=0.2\text{V RS232}$$

This signal provides also a "clear to send" (CTS) pulse for the ACA#1 17.

DC restoration circuit 33 implemented in this embodiment is based on the assumption that at the back porch period the video signal is steady on o-volts DC. Sampling video signal at back porch time and comparing this sample signal averaged on several cycles with zero volts will provide a correction signal.

The signal is fed into the video amplifier network whenever video signal is transmitted and disconnected when the serial data is transmitted.

The transmission baud rate of the ACA was chosen to enable one byte transmitting during time available on each TV line (52 usec) and from VTS jitter sensitivity considerations.

The general block diagram of the ground station is illustrated in FIG. 3 (data, reduction mode) and FIG. 4 (display mode).

After landing, each of A/C cassettes 4 is replayed on a video player, the video RS-170 will go through a video decoder that will collect back the digital data and transfer it to the computer memory:

The decoder functions use the same concept as the encoder.

As illustrated in FIG. 9 it detects sync pulses by sync stripper 31. A video formatter 32 provides switch control pulse GNU/RS232.

Figure 10:
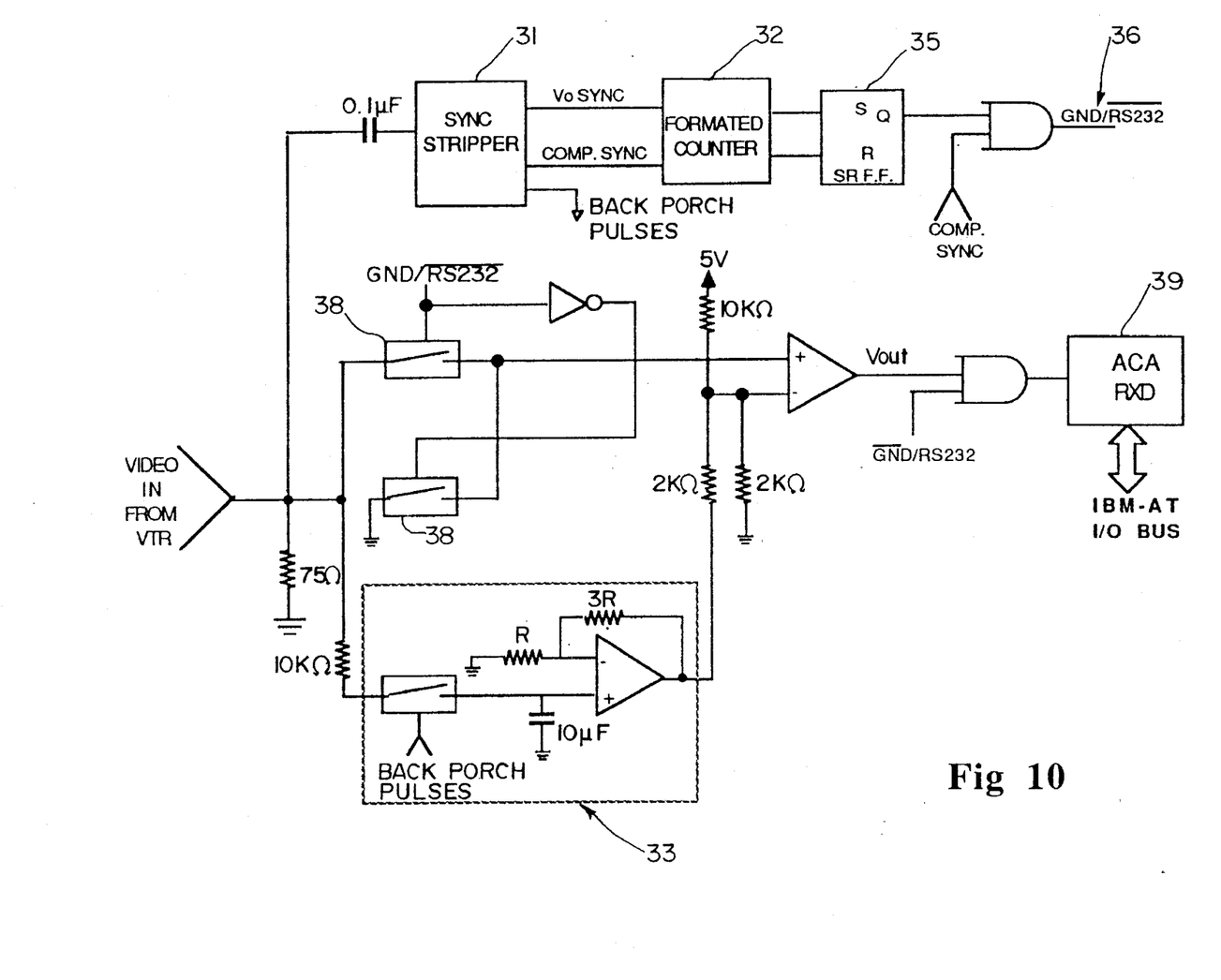
FIG. 10 shows a block diagram illustrating the video decoding circuit which is part of the ground station, shown in FIG. 2.

The Video Decoder block diagram is illustrated in FIG. 10, and in installed on a PCB inside the computer.

The decoder functions use the same concept as the encoder.

As illustrated in FIG. 9 it detects sync pulses by sync stripper 31, A video formatter 32 provides switch control pulse GND/RS232 38.

The gated output GND/RS 232 36 is used to activate switching 38 between the video signal lines and the RS-232 digital data signal lines as complying with the two equations:

$$\text{Vout: GND/RS 232="0"}=[\text{video-in-}(0.45+\text{Vporch})]\text{AOL~RS~232}$$

$$\text{Vout: GND/RS 232="1"}=[0-(0.45+\text{Vporch})]\text{AOP~OV}$$

DC restoration circuit is identical with the airborne encoder based on back porch DC level.

The digital data collected through this process will be transferred through an ACA 39 into the ground computer memory.

Figure 11:
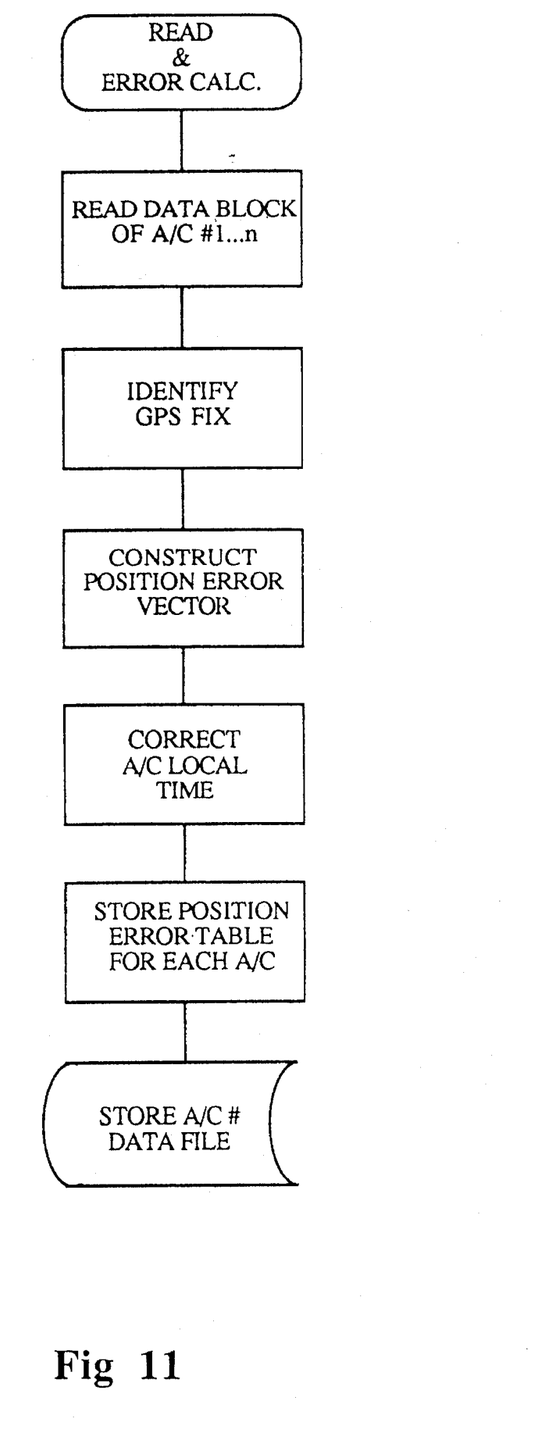
FIGS. 11 and 12 show the various data reduction stages of the ground station computer, shown in FIG. 2.
Figure 12:
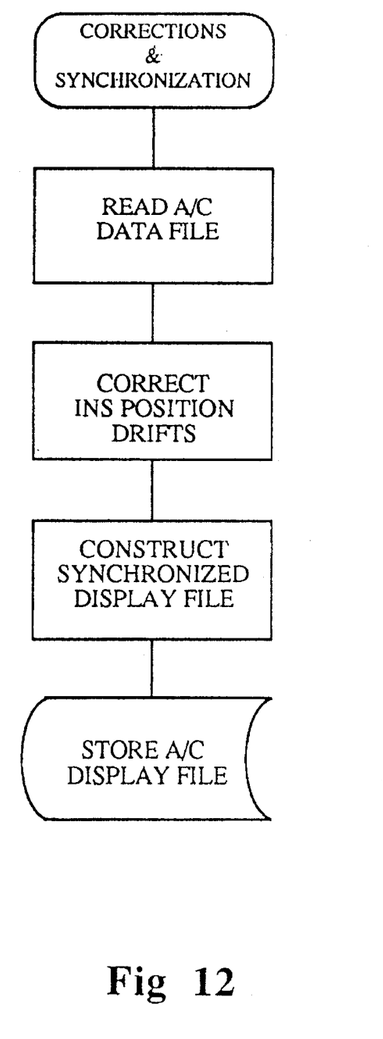

In the computer the gathered data from all A/C will go through the following process, as described in FIGS. 11 and 12:

a. Position errors will be calculated by comparing GPS position parameters to INS parameters, b. Time base will be corrected by GPS UTC c. A corrected position vector will be constructed using the position error table previously constructed.

d. Off-line kill/miss calculations will be done at any pilot's fire command.

e. A display file containing all A/C corrected vectors and kill/miss calculations will be constructed.

I claim:

1. A method to gather, process and display aircraft operations data comprising:

conducting aircraft operation with multiple aircraft and collecting selected flight data in each of said aircraft in an airborne computer in each of said aircraft;

encoding said selected flight data collected in each said computer in each of said aircraft by an encoder and recording said encoded selected flight data onto a video tape in each said aircraft;

sensing inertial navigation data by an inertial navigation system on said aircraft, determining each aircraft location therefrom, and providing inertial navigation system location data to each said airborne computer;

transferring said inertial navigation system location data to a monitoring apparatus in each said aircraft;

sensing global positioning system satellite signals and determining each aircraft global positioning system location data by time differentiating said global positioning system satellite signals;

transferring said global positioning system location data to said monitoring apparatus in each said aircraft using an asynchronous protocol;

encoding said global positioning system location data and said inertial navigation system location data in each said aircraft monitoring apparatus with contemporaneously selected flight data and recording said global positioning system location data, said inertial navigation system location data and said flight data onto said video tape in each said aircraft;

reading said encoded selected flight data from said video tape in each said aircraft and decoding said encoded selected flight data from each said aircraft;

creating a display file by processing the decoded selected flight data;

generating from said display file at least one of tabular, computer generated graphical, and video representations of each said aircraft operations during which each said aircraft selected flight data was collected;

decoding each said aircraft encoded global positioning location data and said inertial navigation system location data and entering said global positioning location data and said inertial navigation system location data in said display file;

comparing said decoded inertial navigation location data to said decoded global positioning location data and computing a correction factor representative of the error of said inertial navigation location data; and correcting each said aircraft inertial navigation location data by applying said correction factor to each said aircraft inertial navigation location data in said display file.

2. The method of claim 1;

wherein said aircraft global positioning system location data is determined by obtaining differential global positioning system location data and wherein the computing of said correction factor is the computing of a differential correction factor.

3. The method of claim 1, wherein the encoding is by an asynchronous encoding protocol.

4. The method of claim 1, further comprising:

creating a plurality of display files from multiple aircraft and combining said display files into a single display file by synchronizing the data using a common time reference, and generating from said combined plurality of display files at least one of said tabular, computer generated graphical and video representations of said multiple aircraft operations during which said selected flight data was collected.

5. An apparatus to gather, process and display aircraft operations data comprising:

data storage means;

means for collecting selected aircraft flight data during aircraft operations and or storing said selected aircraft flight data in said data storage means;

means for encoding said stored selected aircraft flight data;

means for recording said encoded selected aircraft flight data onto video tape in a video tape recorder;

means for reading said encoded and recorded selected aircraft flight data from said video tape;

means for decoding said selected encoded aircraft flight data;

means for processing said decoded selected aircraft flight data to create a display file;

means for generating at least one of tabular, computer generated graphical, and video representations of said selected aircraft flight data to debrief said aircraft operations;

means for acquiring and inputting inertial navigation system location data into said data storage means;

means for monitoring said inertial navigation system location data;

means for determining aircraft position from global position system location data;

means for transferring said global position system location data to said means for monitoring said inertial navigation system location data;

means for encoding said global positioning system location data and said inertial navigation system location data in said means for monitoring with said selected aircraft flight data;

means for decoding said global positioning system location data and said inertial system location data;

means for transferring said global positioning system location data and said inertial navigation system location data into said display file;

means for comparing said inertial navigation system location data with said global positioning system location data and means for computing a correction factor for the difference in aircraft location determined by the inertial navigation system and by the global positioning system; and means for correcting said aircraft inertial navigation system location data by applying said correction factor to the aircraft inertial navigation location data in said display file.

6. An apparatus as in claim 5 wherein:

said means for determining said global position location data comprises a differential global positioning system and said means for computing said correction factor comprises means for computing a differential correction factor.

7. An apparatus as in claim 5 further comprising:

means for creating a plurality of said display files generated from multiple aircraft;

means for combining said display files from multiple aircraft into a single display file comprising time synchronization means; and means for generating at least one of said tabular, computer generated graphical, and video representations of said combined display files.

8. An apparatus to gather, process and display aircraft operations data comprising:

a flight monitor containing a central processing unit for selecting and collecting aircraft flight data during aircraft operations;

a memory storage device connected to said flight monitor to hold said selected aircraft flight data;

a digital encoding device connected to said memory storage device to format said selected aircraft flight data by an asynchronous protocol;

a digital video tape recorder containing a video tape and connected to receive said encoded data from said encoding device;

a video encoder connected to said digital video tape recorder for detecting vertical and composite synchronization signals in the video tape and for determining the number of horizontal video lines per video tape window;

a switching circuit connected to said digital encoding device and said video tape recorder, to transmit said asynchronously encoded selected aircraft flight data onto said video tape at a rate of one byte per line of video tape window;

a video decoder to detect said asynchronously encoded selected aircraft flight data on said video tape and to transmit said selected aircraft flight data to a data storage device;

a ground station comprising a computer connected to said data storage device for producing a display file from said selected aircraft flight data in said data storage device, and for generating at least one of tabular, computer generated graphical, and video representations of said selected aircraft flight data to facilitate debriefing of said aircraft operations.

* * * * *